United States Patent [19]

Petersen, Ross K.

[11] 3,928,008
[45] Dec. 23, 1975

[54] FILTERING APPARATUS
[76] Inventor: Petersen, Ross K., 2974 W. River Road, Minneapolis, Minn. 55406
[22] Filed: Aug. 5, 1974
[21] Appl. No.: 494,539

[52] U.S. Cl. .................. 55/472; 55/473; 55/417; 55/493
[51] Int. Cl.² ........................................ B01D 46/00
[58] Field of Search...... 55/410, 417, 467, 471–473, 55/482, DIG. 29, 493, 490, 509; 98/33 A, 33 R, 115 LH, 39

[56] References Cited
UNITED STATES PATENTS

| | | | |
|---|---|---|---|
| 2,335,428 | 11/1943 | Lofgren | 55/467 |
| 2,808,124 | 10/1957 | Attwood | 55/473 |
| 3,063,224 | 11/1962 | Getzin | 55/693 |
| 3,093,401 | 6/1963 | Hagendoorn | 55/493 |
| 3,301,167 | 1/1967 | Howard et al. | 55/473 |
| 3,616,624 | 11/1971 | Marsh | 55/472 |

*Primary Examiner*—Bernard Nozick
*Attorney, Agent, or Firm*—Burd, Braddock & Bartz

[57] ABSTRACT

An air filtering apparatus having a housing with an air passage separated with a bulkhead into an inlet chamber and a filtering chamber. A motor driven blower located in the inlet chamber moves air through the passage and a HEPA filter located in the filtering chamber. A HEPA filter is supported in an inclined position in the air passage so that an air inlet plenum chamber is in communication with the entire inlet side of the filtering media and an air outlet plenum chamber is in communication with the entire outlet side of the filtering media. A holder pivotally mounted on the housing engages the top of the filter to hold the filter in assembled inclined relation in the housing.

20 Claims, 6 Drawing Figures

U.S. Patent  Dec. 23, 1975  3,928,008
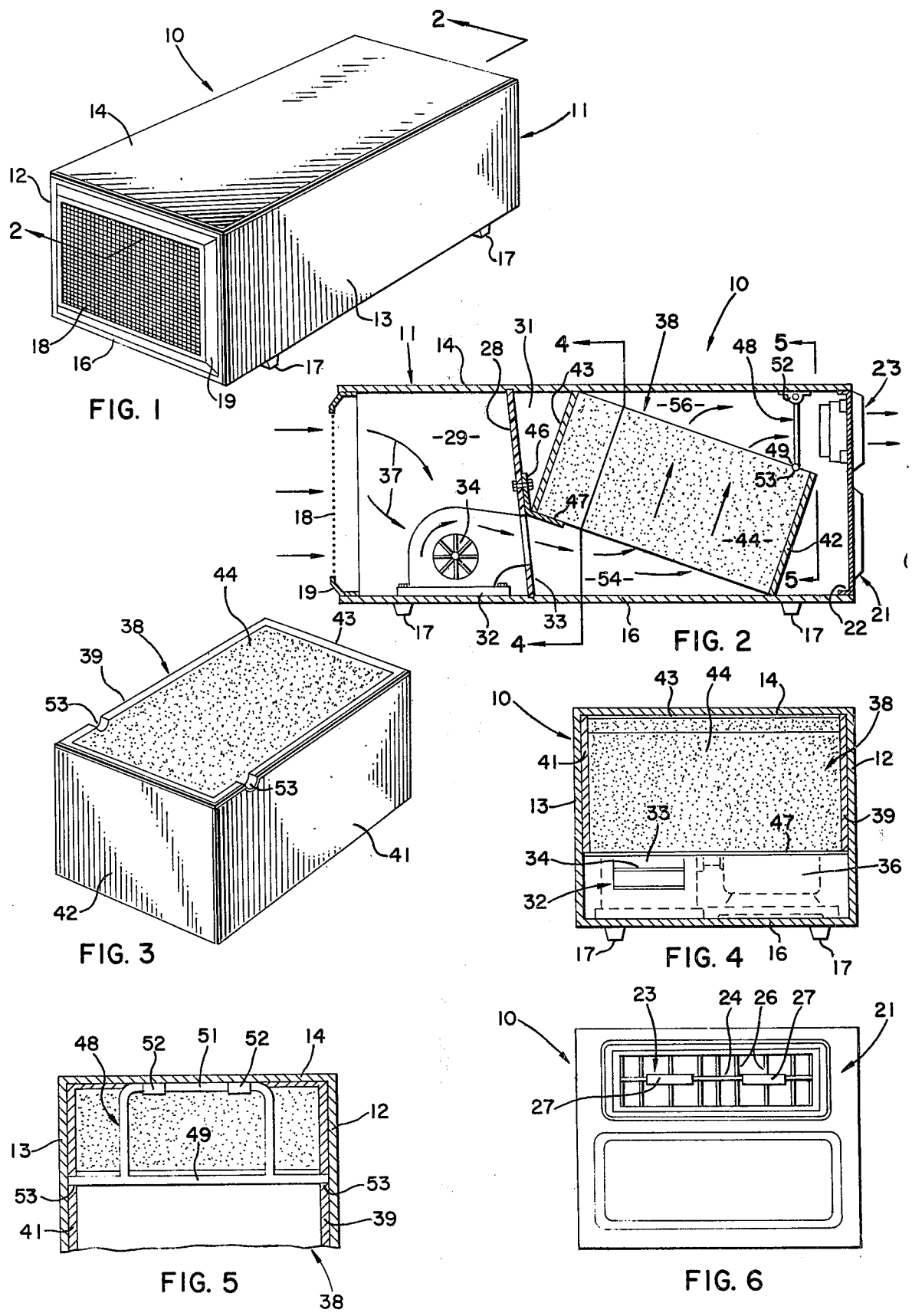

FILTERING APPARATUS

BACKGROUND OF INVENTION

High efficiency air filters known as HEPA filters are being used to remove contaminants from the air. These filters are widely used to capture very fine particulate matter. The HEPA filter is a relatively low velocity filter designed to efficiently remove finely divided particulates from gas streams. The particles are collected on the filtering media. The particulate material storage capacity is largely a matter of total media surface area. The filters must be replaced when their resistance to the movement of air exceeds the abilities of the air moving system.

SUMMARY OF INVENTION

The invention is directed to an apparatus of separating foreign materials, contaminants, particulates and aerosols from pneumatic fluids or gases. More particularly, the invention is an air filtering apparatus having a housing with passage means for carrying the air through the filter. The air is moved through the passage with a blower-like air moving means. The filtering means is located in the passage and is positioned in an inclined position relative to the longitudinal axis of the passage. A holding means cooperates with the housing and the filtering means to hold the filtering means in the inclined position. The inclined filtering means separates a filtering chamber into an inlet plenum space and an outlet plenum space. The plenum spaces are exposed to the entire inlet and outlet sides of the filtering media so that a relatively uniform amount of air moves through the entire filtering media. The holding means is a movable hanger which permits the filtering means to be removed in a convenient manner.

An object of the invention is to provide a gas filtering apparatus with a filter that can be removed without tools or structures, as nuts and bolts. A further object of the invention is to provide an air filtering apparatus with a filter that is angularly positioned relative to the air passage to provide a maximum size filter in a minimum of space. A still further object of the invention is to provide air filtering apparatus with a filter that has a relatively large depth and surface area located in an inclined position in an air filtering passage. Yet another object of the invention is to provide a relatively low cost and reliable gas filtering apparatus that is relatively small in size and maintenance-free.

IN THE DRAWINGS

FIG. 1 is a perspective view of the air filtering apparatus of the invention;

FIG. 2 is an enlarged sectional view taken along line 2—2 of FIG. 1;

FIG. 3 is a perspective view of the HEPA filter used in the air filtering apparatus of FIG. 1;

FIG. 4 is a sectional view taken along line 4—4 of FIG. 2;

FIG. 5 is a sectional view taken along line 5—5 of FIG. 2; and

FIG. 6 is an elevational view of the right end of FIG. 2.

DESCRIPTION OF PREFERRED EMBODIMENT

Referring to the drawing, there is shown in FIGS. 1 and 2 the air filtering apparatus of the invention, indicated generally at 10. Apparatus 10 is useable to filter contaminants, particulate material, aerosols, pollen, and like foreign material from a gas, as air. The following description will be limited to the removal of foreign materials from the air. It is understood that the pneumatic fluid can be other types of gases.

Air filtering apparatus 10 has a generally rectangular shaped housing or cabinet 11. The housing 11 has generally upright side walls 12 and 13 joined to a flat top wall 14. The bottom of the housing is closed with a bottom wall 16. A plurality of downwardly directed feet 17 are secured to the bottom wall to support the housing on a supporting surface. The front of housing 11 has a generally rectangular inlet grill 18. Grill 18 is attached to a rectangular frame 19. Frame 19 fits in the housing and is secured to the walls of the housing. Grill 18 comprises a screen-like construction comprising a plurality of interrelated horizontal and vertical wire members. Other types of grill structures can be used to close the inlet of the passage through the housing.

Referring to FIG. 6, the rear of housing 11 is closed with an outlet panel indicated generally at 21. As shown in FIG. 2, the outer peripheral edges of outlet panel 21 have an inwardly directed peripheral flange 22. Flange 22 cooperates with the walls of the housing so that the panel 21 is removably mounted on housing 11. Outlet panel 21 has a generally rectangular air diffuser 23. Air diffuser 23 has a plurality of spaced horizontal louvers 24 and vertical louvers 26. A pair of control handles 27 are structurally connected to the horizontal and vertical louvers 24 and 26. Handles 27 are movable in horizontal and vertical directions to change the angular orientation of louvers 24 and 26. In this manner, the outlet flow of air can be directed left or right, up or down, as desired.

As shown in FIG. 2, the passage through housing 11 is separated by a generally flat member or bulkhead 28 into an inlet chamber 29 and a filtering chamber 31. Inlet chamber 29 is in communication with inlet grill 18 whereby air can flow through grill 18 and through the inlet chamber 29. Mounted on bottom wall 16 in inlet chamber 29 is a blower 32. The blower 32 has a discharge section aligned with an opening 33 in member 28. The blower 32 has a rotatable impeller 34 driven by an electric motor 36. The impeller moves the air, indicated by arrows 37, through the inlet chamber 29, opening 33 and into the filtering chamber 31. The blower 32 can be replaced with other types of air moving means, as fans.

Located in the filtering chamber 31 is an air filter indicated generally at 38. Filter 38 is a self-contained unit which can be removed from the passage via the exit or outlet end. This is accomplished by removing the outlet panel 21. This provides access into the filtering chamber 31 so that the entire filter 38 can be removed.

Filter 38 has a box-shaped frame comprising generally upright side walls 39 and 41 joined to end walls 42 and 43, respectively. Secured to and located within the walls 39, 41, 42, and 43 is a filtering media 44.

Filter 38 is a high efficiency particulate air filter known as HEPA filter. These filters use dry fiber filter media 44 in thin, porous sheet form consisting of ultrafine fibers. The fibers are usually less than 1 micron in diameter. Filter media 44 is pleated or fan-folded to form deep pockets to achieve greater air flow capacity. The fibers may be glass or a combination of glass and asbestos. Separators may be used between the folds to prevent collapse and to render maximum area for air filtering. The frame is rigid and can be made from plywood, steel or aluminum. The HEPA filtering media can have an efficiency rating of 99.97% for 0.3 micron particles.

As shown in FIG. 2, filter 38 is located in an inclined position relative to the horizontal or longitudinal axis of the passage through housing 11. A transverse bracket 46 is secured to divider member 28. Bracket 46 has a rearwardly and downwardly extended transverse lip 47. Lip 47 is located above opening 33. Lip 47 directs the air flowing through opening 33 in a downward direction toward bottom wall 16. The front end wall 43 of filter 38 rests on or engages the top of lip 47. The upper end of wall 43 engages the bottom surface of top wall 14. The opposite end wall 42 engages the bottom wall 16. As shown in FIG. 4, side walls 39 and 41 are located adjacent the side walls 12 and 13 of the housing. Thus, filter 38 is located across the entire passage through housing 11.

As shown in FIGS. 2 and 5, filter 38 is held in an inclined position in the housing with a holder indicated generally at 48. Holder 48 has a transverse rod 49 secured to a generally inverted, U-shaped member 51. A pair of support bearings or brackets 52 pivotally mount U-shaped member 51 to the bottom of top wall 14. The U-shaped member is pivoted about a generally transverse axis and can be moved toward and away from the filter 38. As shown in FIGS. 2, 3 and 5, the side walls 39 and 41 of the filter 38 have notches or cutouts 53 to accommodate ends of the transverse rod 49. When holder 48 is in the locked position, as shown in FIGS. 2 and 5, the ends of rod 49 are located in notches 53. This holds the holder 48 in the locked position. The filter 38 cannot move upwardly as the holder 48 holds the side wall 42 in engagement with bottom wall 16. The upper end of filter 38 is locked between the lip 47 and top wall 14 of housing 11.

As shown in FIG. 2, the inclined filter 38 divides the filtering chamber 31 into an inlet plenum space 54 and an outlen plenum space 56. Inlet plenum space 54 is in communication with opening 33. Inlet plenum space 54 is of a size so that it is in communication with the entire inlet side of filtering media 44. The outlet plenum space 56 is also in communication with the entire outlet side of filtering media 44. Inlet plenum space 54 and oulet plenum space 56 are generally of the same size. Outlet plenum space 56 is of a generally triangular configuration and is in general horizontal alignment with air diffuser 23. Thus, the air moving through outlet plenum space 56 moves directly through diffuser 23 to the outside atmosphere. The air diffuser 23 can be operated to direct the air upwardly, downwardly, left or right by the use of control handles 27.

Filter 38 can be readily removed from housing 14 without the use of tools or disassembling parts. The panel 21 is removed from the end of housing 11. The holder 48 is pulled upward, removing rod 49 from notches 53. Filter 38 can be removed from the housing. A new filter is inserted with the end 43 resting on lip 47 and in engagement with top wall 14. Holder 48 is swung down to the locked position with the rod ends in engagement with notches 43. The panel 21 is replaced. The filtering apparatus is now ready for use.

While there has been shown and described a preferred embodiment of the invention, it is understood that various changes in size, material and filtering media may be made by those skilled in the art without departing from the invention.

The embodiments of the invention in which an exclusive property or privilege is claimed are defined as follows:

1. An apparatus for separating foreign materials from a pneumatic fluid comprising: a generally rectangular shaped housing having side walls, a top wall and a bottom wall and having passage means with a generally horizontal axis for carrying pneumatic fluid, an inlet at one end of the housing and an outlet on the other end of the housing in communication with the passage means, a transverse member mounted in the housing dividing the passage means into an inlet chamber and a filtering chamber and having an opening leading from the inlet chamber to the filtering chamber, means located in the inlet chamber operable to move fluid from the inlet through the passage means through said opening, filtering means located in and positioned diagonally across the filtering chamber for separating foreign materials from the fluid moving through the filtering chamber, said filtering means having a box-shaped frame and filtering media located within and across said frame, means connected to the transverse member to support one end wall of said frame in an elevated position relative to the horizontal axis of the passage means with an upper end of said end wall in engagement with the top wall of the housing, and the bottom wall of said housing supporting the other end wall of said frame diagonally dividing said filtering chamber into an inlet plenum and an outlet plenum, and holding means on said housing and on said filtering means holding the filtering means in the housing.

2. The apparatus of claim 1 wherein: the means to support said one end wall of said frame comprises a bracket attached to the transverse member, said bracket having a transverse lip engageable with the filtering means.

3. The apparatus of claim 1 wherein: the filtering means is a HEPA filter.

4. The apparatus of claim 1 wherein: the filtering chamber has an inlet plenum space open to the entire inlet side of the filtering means.

5. The apparatus of claim 1 wherein: the filtering chamber has an outlet plenum space open to the entire outlet side of the filtering means.

6. The apparatus of claim 1 wherein: the filtering chamber has an inlet plenum space open to the entire inlet side of the filtering means, and an outlet plenum space open to the entire outlet side of the filtering means, said inlet and outlet plenum spaces being generally the same size.

7. The apparatus of claim 1 wherein: said transverse member is mounted on said side, top and bottom walls of the housing, said member having an opening in the lower portion thereof allowing fluid to move through the transverse member, said means to support a part of the filtering means comprising a bracket attached to the transverse member above the opening, one end of said frame being positioned on the bracket with the other end of said frame being located on the bottom wall whereby said filtering means is inclined in said passage means, said holding means engageable with the frame to hold the frame on the bracket and bottom wall.

8. The apparatus of claim 7 wherein: said box-shaped frame has end walls and side walls, said side wall of the frame being located adjacent the side walls of the housing, one end wall of the frame being positioned on the bracket and engageable with the top wall of the housing, the other end wall of the frame being in engagement with the bottom wall, said holding means being engageable with the side walls of the frame.

9. The apparatus of claim 7 wherein: the bracket includes a transverse lip, said one end of the frame being located on the lip.

10. The apparatus of claim 7 wherein: the filtering chamber has an inlet plenum space open to the entire inlet side of the filtering means.

11. The apparatus of claim 7 wherein: the filtering chamber has an outlet plenum space open to the entire outlet side of the filtering means.

12. The apparatus of claim 7 wherein: the filtering chamber has an inlet plenum space open to the entire inlet side of the filtering means, and an outlet plenum space open to the entire outlet side of the filtering means, said inlet and outlet plenum spaces being generally the same size.

13. The apparatus of claim 7 wherein: the holding means includes a transverse rod engageable with the frame, and means to pivotally mount the rod on the housing.

14. The apparatus of claim 13 wherein: the means to pivotally mount the rod includes a U-shaped member.

15. The apparatus of claim 1 wherein: the holding means includes a transverse rod engageable with the filtering means, and means to pivotally mount the rod on the housing.

16. The apparatus of claim 15 wherein: the means to pivotally mount the rod includes a U-shaped member.

17. An apparatus for separating foreign materials from a pneumatic fluid comprising: side walls and top and bottom walls forming a housing having a generally rectangular filtering chamber with passage means having a generally longitudinal axis for carrying pneumatic fluid, a transverse member closing one end of the filtering chamber and having an inlet opening to said filtering chamber, means mounted on the housing located adjacent said inlet opening for moving fluid through the passage means, an outlet from said chamber at the other end of the filtering chamber spaced from the inlet opening, filtering means located in the filtering chamber for separating foreign materials from the fluid moving through the passage, said filtering means having a box-shaped frame and filtering media located within and across said frame, means in the filtering chamber connected to the transverse member for supporting one end wall of said frame in an elevated position relative to the longitudinal axis of the passage means with an upper end of said end wall in engagement with the top wall of the housing, and the bottom wall of the housing supporting the other end wall of said frame to support said frame in an inclined position diagonally dividing the filtering chamber into an inlet plenum space open to the inlet opening and the entire inlet side of the filtering means, and an outlet plenum space open to the outlet from said chamber and the entire outlet side of the filtering means, and holding means cooperating with the housing in the filtering means to hold the filtering means in its inclined position in the housing.

18. The apparatus of claim 17 wherein: the means to support said one end wall of said frame in an elevated position includes a transverse member, said transverse member having a lip engageable with the filtering means.

19. The apparatus of claim 17 wherein: said inlet plenum space and said outlet plenum space are generally the same size.

20. An apparatus for separating foreign materials from a pneumatic fluid comprising: a housing having side walls, a top wall and a bottom wall and having passage means for carrying pneumatic fluid, an inlet and an outlet on the housing in communication with the passage means, a transverse member mounted on said side, top and bottom walls of the housing dividing the passage means into an inlet chamber and a filtering chamber, said transverse member having an opening in the lower portion thereof leading from the inlet chamber to the filtering chamber allowing fluid to move through the transverse member, means located in the inlet chamber operable to move fluid through the passage means through said opening, filtering means located in and positioned diagonally across the filtering chamber for separating foreign materials from the fluid moving through the filtering chamber, said filtering means having a box-shaped frame and filtering media located within and across said frame, a bracket attached to the transverse member above said opening to support one end wall of said frame in an elevated position, one end wall of said frame being positioned on the bracket with the other end wall of said frame being located on the bottom wall diagonally dividing said filtering chamber into an inlet plenum and an outlet plenum, and holding means on said housing and on said filtering means engageable with the frame to hold the frame on the bracket and bottom wall, said holding means including a transverse rod engageable with the frame, and means to pivotally mount the rod on the housing, said means to pivotally mount the rod on the housing including a U-shaped member.

* * * * *